Dec. 19 1922.
C. E. DAILEY ET AL.
AIR FILTER.
FILED OCT. 13, 1921.
1,439,151
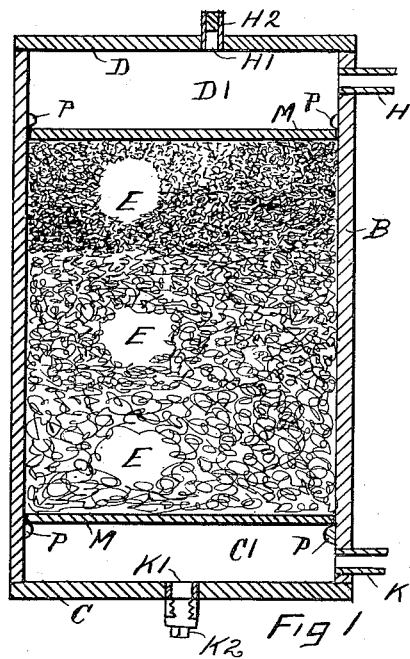
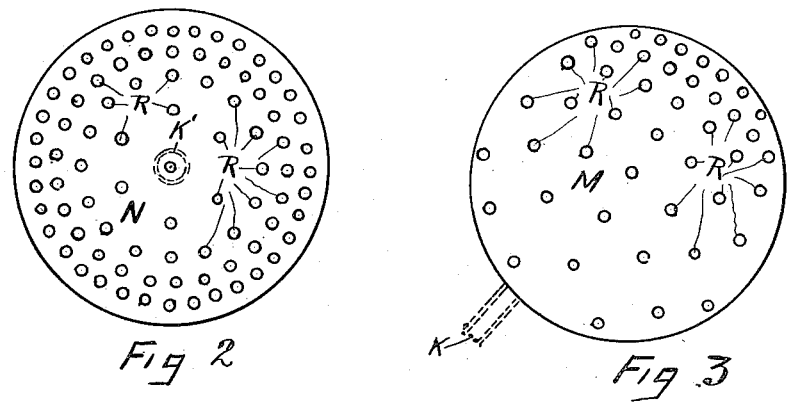
INVENTOR
Charles E Dailey
Samuel C Dailey
BY
Francis C Huebner
ATTORNEY.

Patented Dec. 19, 1922.

1,439,151

UNITED STATES PATENT OFFICE.

CHARLES E. DAILEY AND SAMUEL C. DAILEY, OF REEDLEY, CALIFORNIA.

AIR FILTER.

Application filed October 13, 1921. Serial No. 507,513.

*To all whom it may concern:*

Be it known that we, CHARLES E. DAILEY and SAMUEL C. DAILEY, citizens of the United States, and residents of Reedley, in the county of Fresno and the State of California, have invented a new and useful Improvement in Air Filters, of which the following is a specification.

Our invention relates to air filter and more especially to a filter for purifying the air of dust and dirt before admitting it thru the carbureter into an internal combustion engine. It is well known that air surrounding a tractor under ordinary use is full of dust and dirt and that such dust and dirt will ruin the tractor engine when the dust is admitted from the carbureter into the cylinders. It is especially useful in combination with carbureters on a tractor engine.

The object of our invention is an improvement in an air filter which will thoroughly cleanse the air from dirt and dust before admitting it into the carburetor, wherein all the filtering material will function, which filter can readily be cleansed of dirt and dust lodged therein after it has been in use. In the drawing accompanying the specification hereinafter set forth, Figure 1 is a sectional view of the filter. Figure 2 is a top view of one form of perforated partition intended to equalize the distribution of the air as it passes thru the filtering machine. Figure 3 is a modified form of partition. In said drawing B is a box or container for holding the filtering material having a bottom C and a top D. E is the filtering material within the container which can be of any of the usual filtering substances, such as hemp, hair, wool, cotton, charcoal, etc. We have found it preferable to place coarse filtering material at the bottom, a medium grade in the center and a finer grade at the top, and to keep the filtering material saturated with oil. H is an air outlet in the top of the container and K is an air inlet at or near the bottom. The outlet H and the inlet K are preferably on the side of the filter. $K^1$ is an opening in the approximate center of the bottom C of the container. It can also be used for an intake if desired. $H^1$ is an opening in the top of the container which can be used for an outlet if desired and is also useful in pouring a dissolvent into the container for the purpose of cleaning the filtering material of the dirt which has accumulated therein without removing the filter, or the filtering medium. A closure $H^2$ is provided for the opening $H^1$ and a closure $K^2$ for the opening $K^1$. M is a plate, shown more definitely in Figure 3 one of which holds the filtering material a spaced distance from the top and one from the bottom of the container. This plate has perforations R arranged closer together as the radial distance increases from the intake or outlet, as shown in Figures 2 and 3. In Figure 3 the outlet is shown to be on the side. N is a modified form of plate shown in Figure 2 which is used when the intake is in the approximate center of the bottom of the container, but which shows the same general arrangement of the perforations in the plate. It is well known that in drawing air thru the filter the air will follow the line of least resistance and by placing one of the plates M or N under the filtering material and one over the filtering material as shown in Figure 1, leaving an air chamber $C^1$ between the bottom C and plate M, and an air chamber $D^1$ between the top D and the upper plate M, the air will be more equally distributed thru the filtering material inasmuch as the holes or perforations are closer together as the radius from the intake increases. The opening $H^1$ should be placed in such position so that in pouring in liquid thru such opening it will strike the plate M or N at some place where there is no perforations, the purpose being to make the dissolving or cleansing liquid spread over the plate and more readily soak up the whole of the filtering material. Indent or stops P are used for holding the plates a spaced distance from the top and bottom of the container. $K^1$ is a drain opening.

We claim as new and ask Letters Patent:

1. In an air filter, the combination of a container having a top and bottom, there being an air inlet and an air outlet in the container, perforate plates mounted in the container and spaced from the top and bottom thereof, the spacing of the perforations in one of the plates decreasing as the distance thereof from the inlet increases, there being an opening in the top of the container, a closure for said opening, and filtering material between the plates.

2. In an air filter, the combination of a container having a top and bottom, there being an air inlet and an air outlet in the container, perforate plates mounted in the container and spaced from the top and bottom thereof, the spacing of the perforations in one of the plates decreasing as the distance thereof from the inlet increases, there being an opening in the top of the container, there being an opening in the bottom of the container, closures for both openings, and filtering material between the plates.

3. In an air filter, the combination of a container having a top and bottom, there being an air inlet and an air outlet in the container, perforate plates mounted in the container and spaced from the top and bottom thereof, the spacing of the perforations in one of the plates decreasing as the distance thereof from the air inlet increases, and filtering material between the plates.

CHAS. E. DAILEY.
SAMUEL C. DAILEY.